April 3, 1973   G. A. HARSTEAD ET AL   3,725,198

NUCLEAR CONTAINMENT SYSTEM

Filed April 3, 1969

United States Patent Office 3,725,198
Patented Apr. 3, 1973

3,725,198
NUCLEAR CONTAINMENT SYSTEM
Gunnar A. Harstead, Park Ridge, N.J., and John Locante, Monroeville, and James G. Russell, Pittsburgh, Pa., assignors to Westinghouse Electric Corporation, Pittsburgh, Pa.
Filed Apr. 3, 1969, Ser. No. 813,136
Int. Cl. G21c 9/00
U.S. Cl. 176—37
4 Claims

ABSTRACT OF THE DISCLOSURE

A containment structural system consisting of a sealed inner pressure containing shell, preferably of steel, and an outer cylindrical shell, preferably of concrete, spaced therefrom and built on a common base. The space between the shells is filled with a fluid such as water so that the fluid entirely covers the inner shell to provide radiation shielding and to assist in carrying pressure forces in the event of a loss of coolant accident.

BACKGROUND OF THE INVENTION

This invention relates to nuclear reactor containment systems, and more particularly, to containment systems which must provide radiation shielding and a pressure barrier which can withstand relatively high internal pressure loads.

Most nuclear steam generating systems are contained within an outer containment structure which is generally formed from several feet of concrete. This thick concrete containment structure performs two functions: it acts as a radiation shield and it serves as a barrier to the escape of radioactive materials. In either case, it must be designed for the maximum credible accident, i.e. for the maximum amount of radiation or the maximum pressure excursion; usually due to a loss of coolant accident. Although new pressure suppression systems such as that exemplified by the popularly called "Ice Condenser Containment System" of Westinghouse Electric Corporation described in a copending application Ser. No. 528,639, filed Feb. 18, 1966 by Sterling J. Weems et al., now Pat. No. 3,423,286, have reduced the thickness of the concrete barrier from the maximum pressure design standpoint, its thickness has not been practically reduced because it must still serve the function as a radiation barrier.

U.S. Pat. 3,115,450 issued Dec. 24, 1963 to J. L. Schanz, discloses a sealed inner containment including an inner chamber in which a reactor core is supported, a sealed outer containment surrounding and spaced apart from the inner containment and forming therebetween an outer chamber, a pool of liquid in the outer chamber extending from a level substantially below to a level substantially above the extremities of the nuclear core to provide a combined radiation shield and heat sink, and means for relieving fluids from the inner chamber into the pool in the outer chamber. Although this patent shows water being used as a radiation shield, it should be clear that it only acts in this capacity as long as the nuclear steam generating system remains intact. In fact, upon the occurrence of a loss of coolant accident the steam which may be highly radioactive if some fuel rods have failed escapes into the shielding water and the radioactive material is carried into proximity with the outer containment wall. Thus the outer containment will may not be reduced in thickness because of the close proximity of radioactive material under credible accident circumstances.

U.S. Pat. 3,258,403 issued June 28, 1966 to F. L. Malay and assigned to Westinghouse Electric Corporation describes a reactor enclosure which comprises two sealed liners or containers one within the other which are separated by a means which permits the flow of fluid through the space between the two liners. The space between these two containers is maintained at a pressure below the internal pressure of the inner containment and the pressure outside the outer containment. All leakage into the spacing closed by the two containers is pumped into the inner container. Although the inner containment wall in this patent serves to displace radioactive material from the outer containment wall its effectiveness is limited by the low shielding quality of the space between the containers. Further, the ability of the low pressure space between the two containers to transmit forces is minimal in the absence of the relatively expensive concrete force transmitting means disclosed therein. Moreover, both containments must be sealed which adds appreciably to construction expenses.

SUMMARY OF THE INVENTION

The containment system, in accordance with this invention, serves to provide a superior radiation and pressure barrier, at a reduced cost, through the inclusion of a double containment system having the space between the two containment walls filled with a fluid which is highly effective in containing radiation and which serves to transmit forces between the inner and outer containment walls.

The sealed containment system comprises a sealed inner container, preferably of steel, enclosing the reactor vessel and the related components for supplying pressurized coolant to the vessel, a cylindrical outer container, preferably of concrete, completely surrounding and spaced outwardly from the inner container, and a force transmitting and radiation shielding fluid occupying the space between the inner container and the outer container. The fluid utilized is preferably borated water which serves to transmit forces from the inner wall to the outer wall and which is known to be an excellent radiation shield. Additional chemicals may be added to the water in order to render fission products soluble therein or to otherwise combine with the fission products to assure that they do not escape from the free surface of the borated water. The borated water serves the additonal function of cooling the steel inner containment wall by acting as a heat sink therefor.

The above described containment system is particularly useful when combined with an effective pressure suppression means such as the "Ice Condenser Containment System" aforementioned. The "Ice Condenser Containment System" functions to appreciably lower the design pressure necessary for the containment structure and thus reduces the amount of concrete necessary to maintain structural integrity upon the unlikely occurrence of a complete loss of coolant accident. Borated water may thus, in accordance with this invention, take the place of an appreciable amount of concrete in a structure which may be simply constructed and which because of its heat sink qualities may be more effective than prior containment systems.

DESCRIPTION OF THE DRAWINGS

For better understanding of the invention reference may be had to the accompanying drawings, in which.

DESCRIPTION OF THE PREFERRED EMBODIMENT

Figure 2:
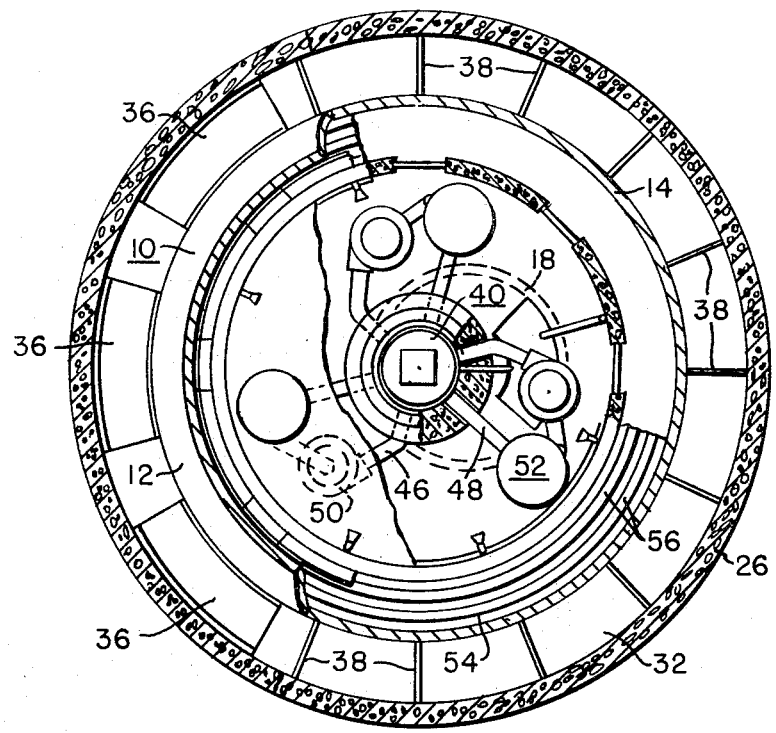
FIG. 2 shows a sectional view along lines II—II of FIG. 1.
Figure 1:
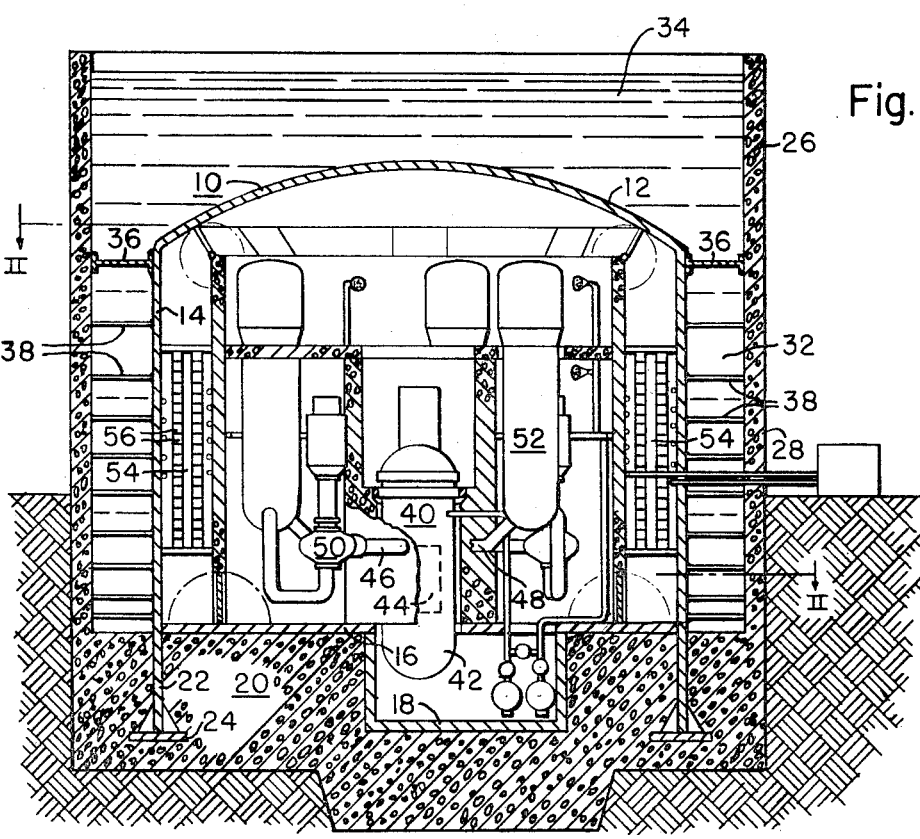
FIG. 1 shows an elevational cross-section view of a reactor containment system in accordance with this invention.

Referring now to FIGS. 1 and 2 of the drawings, an illustrative example of water jacketed containment arrangement enclosing a nuclear steam generating system having an ice condenser pressure suppression arrangement coupled thereto is depicted therein. The containment system includes an inner container 10 which comprises a convex head portion 12, a cylindrical wall portion 14, an annular floor portion 16, and a dry well liner 18. The containment system is supported on a heavy concrete base 20. The cylindrical wall portion 14 preferably includes a cylindrical extension 22 having an annular shoe 24 suitably affixed thereto which may be embedded in the concrete for reasons which will become apparent. The inner container 10, as illustrated, may be suitably fabricated from a relatively thin stainless steel or carbon steel plate and should be so sized as to provide ample room for the steam generating system components and necessary working area.

Surrounding and spaced outwardly from the inner container 10 is an outer container 26. The outer container 26 is supported on the base 20 and may be suitably constructed of a similar material, i.e., concrete, and is suitably relatively thicker than the inner container 10. The outer container 26 includes only a cylindrical wall portion 28.

The space formed by and included between the inner container 10 and the outer container 26 thus includes annular shield region 32 and a surmounting manifold region 34. In accordance with this invention, the annular shield region 32 and at least a portion of the surmounting manifold 34 are filled with a fluid which is capable of acting as a barrier to radiation, transmitting forces between the inner container 10 and the outer container 26, and acting as a heat sink for the inner container 10. An example of a suitable fluid would be borated water.

A plurality of ring girders 36 may be included at the juncture of the convex head portion 12 and the cylindrical wall portion 14 to carry the dome thrust load due to the weight of the fluid in the surmounting manifold 34. Ring girders 36 may be suitably welded to the cylindrical wall portion 14 of the inner container 10 and embedded in cylindrical wall portion 28 of the outer container 26. Further, a plurality of hydrostatic pressure ties 38 may be affixed between the cylindrical wall portion 14 of the inner container 10 and the cylindrical wall portion 28 of the outer container 26, as by welding and embedding or other suitable means respectively, so as to cause the hydrostatic forces existing in the annular shield region 32 to act against each other. The ring girders 36, hydrostatic pressure ties 38, and the shoe 24 cooperatively act to resist the hydrostatic force due to the head of fluid acting on the containers 10 and 26, and thereby produce an integrated structure capable of withstanding great pressure which might be generated in the unlikely event of a loss of coolant accident.

The reactor containment system above described is of advantage when utilized with any nuclear system which utilizes a coolant which can under any circumstances escape from the closed system and spread radiation throughout the containment, it is of particular advantage when utilized with such a system wherein the fluid is pressurized and when escaping can pressurize the containment system, and its desirability is further increased when utilized with such a system having a pressure suppression means such that the containment structure's ultimate design may depend upon radiation rather than pressure bearing criteria. The reactor system as illustrated shows the combined features, i.e., a reactor having a coolant fluid which is pressurized and incorporating a pressure suppression arrangement. More particularly a nuclear reactor 40, as shown, comprises a pressure vessel 42, a nuclear core 44 (shown in dotted lines), coolant inlet means 46, and coolant outlet means 48. The coolant fluid utilized may be borated water at a substantial pressure which may be in excess of 2,000 p.s.i. The water enters the reactor through the inlet means 46 and proceeds through the nuclear core 44 where it absorbs a substantial amount of heat and exits through outlet means 48. The inlet means 46 and the outlet means 48 are part of closed loops including a pump 50 and a steam generating heat exchanger 52, as is well known in the art.

The closed primary loops including pump 50 and heat exchanger 52 are designed as a sealed unit with the reactor vessel 42 to withstand substantial pressure without failure. However, in the unlikely event of a break in any of the closed primary loops a massive quantity of borated water would immediately be released in the form of steam into the containment system substantially raising the pressure therein. Moreover, should the water have been rendered radioactive due to a cladding failure in any of the great number of fuel rods contained in the conventional nuclear core 44 or due to a fuel meltdown the steam escaping from the closed primary loop could be highly radioactive. The containment structure surrounding the above described closed nuclear steam generating system must be designed to withstand the maximum pressure which might be generated by a rupture in a primary coolant loop and for the maximum radiation which could be spread throughout the containment due to such a rupture occurring after a cladding or meltdown failure.

The maximum credible pressure which may exist within the containment system can be appreciably reduced through the use of an effective pressure suppression means. An example of a particularly effective means for reducing the pressure within the containment after a loss of coolant accident may be found in a copending application Ser. No. 528,639, filed Feb. 18, 1966 by Sterling J. Weems et al., now Pat. No. 3,423,286, and assigned to Westinghouse Electric Corporation, and popularly known as the ice condenser containment system. Briefly the ice condenser containment system includes a compartment 54 which is normally separated from that part of the containment which includes the reactor 40 and the heat exchangers 52 but which becomes communicably coupled thereto at very low pressures. The compartment 54 includes a substanial amount of ice in a suitable surface area expanding form generally designated by the numeral 56. In operation, steam escaping from any primary loop would almost immediately be led into and through the ice bed 56. The steam would be substantially condensed as the ice absorbs 144 calories of heat per gram from the steam in going to its liquid phase.

Although the ice condenser containment system is able to substantially reduce the maximum credible pressure to which the containment system may be subject, it does not necessarily result in a reduction in the thickness of concrete necessary for the containment since this thickness would now be determined by the amount of concrete necessary to shield the exterior from the maximum amount of radiation which could be spread throughout the entire interior of the containment. However, in accordance with this invention, a fluid such as borated water may take the place of a substantial amount of concrete in the containment system and act as an effective shield to radiation while providing adequate pressure bearing strength. It should further be noted that the quantity of fluid between the inner container 10 and the outer container 26 also acts as a pressure suppression means in that this substantial quantity of fluid would absorb a substantial amount of heat from the steam escaping through a break in a primary coolant loop.

In the unlikely event that the inner container 10 is breached it is possible that fission product would escape into either of the water filled regions 32 or 34. Depending upon the pressure generated within the normally sealed inner container 10, the borated water may flow into the containment as would be probable toward the bottom of the region 32, or the possibly radioactive steam would flow into the water pool as in the upper regions of lower hydrostatic pressure. Advantage may be taken of the inwardly directed leakage in the lower portion of annular shield region 32 for passing penetration lead lines into the containment. As the steam passing into the water pool might contain fission products, known additives such as caustic soda which renders the pool somewhat alkaline and thereby increase the dissolution of non-condensable fission products are provided in the water filled region 32 and 34. The condensation of the steam and the dissolution of the fission products assures that any leakage into the water pool does not leave the surface of the pool. A purification system may be communicably coupled to the water pool to provide a periodic decontamination of the water should fission products gain access to the pool.

It should also be pointed out that the outer cylindrical containment wall 28 may be dispensed with if the nuclear steam generating system is placed below ground level in a region where the ground would act as fluid barrier to hold the fluid radiation shield. For example, if the steam generating system were placed in a stone quarry excavation, the wall 28 would not be necessary. However, the annular water filled region 32 should not be much wider than necessary to act as a radiation shield since otherwise it might be difficult to control the chemistry of the pool.

While there has been shown and described what is at present considered to be the preferred embodiment of the invention, modifications thereto will readily occur to those skilled in the art. In particular, as indicated, the water jacketed containment constitutes a substantial improvement whether used with a pressure suppression system or not. Moreover, it should be clear that any pressure suppression system may be utilized with this invention. It is not desired therefore that the invention be limited to the specific arrangement shown and described and it is intended to cover in the appended claims all such modifications as fall within the true spirit and scope of the invention.

We claim:
1. A nuclear reactor containment comprising:
    an outer liquid containing concrete housing including only a relatively massive base and a generally cylindrical side wall, an inner generally cylindrical housing located concentrically within said outer housing but spaced therefrom, said inner housing having its lower end anchored to the base of the outer housing to thus form an annular liquid containment space between the two housings;
    said inner housing having a closed top wall spaced below the upper end of the outer housing so that liquid in the outer housing and said annular space may also cover the top of said inner housing;
    a reactor vessel and a steam generating heat exchanger mounted within said inner housing, said reactor vessel containing a reactor core and having a pressurized fluid therein; and
    a body of water occupying said annular liquid space to a level substantially above the top of said inner housing.

2. The nuclear reactor of claim 1, wherein the body of liquid includes borated water.

3. The nuclear reactor of claim 1, wherein a plurality of hydrostatic pressure ties connect said annular side wall and said inner housing.

4. A nuclear reactor containment system comprising, in combination:
    a sealed containment housing enclosing enclosing at least a nuclear reactor vessel and a substantial portion of the steam generating apparatus thereof, said reactor vessel containing a reactor core and having a pressurized fluid therein;
    a wall substantially surrounding and spaced from the sealed containment housing and forming a liquid containment volume therebetween;
    a body of liquid occupying said volume to a level above the top of the sealed containment housing; and
    a substantial body of ice situated within the sealed containment housing, said body of ice being coupled for receiving steam from at least the nuclear reactor vessel upon a rupture of same.

References Cited
UNITED STATES PATENTS

| | | | |
|---|---|---|---|
| 3,115,450 | 12/1963 | Schanz | 176—37 |
| 3,258,403 | 6/1966 | Malay | 176—37 |
| 3,314,858 | 4/1967 | Villadsen | 176—37 |
| 3,438,857 | 4/1969 | Sulzer | 176—37 |
| 3,423,286 | 1/1969 | Weems et al. | 176—37 |
| 3,454,466 | 7/1969 | Pitt et al. | 176—38 |

REUBEN EPSTEIN, Primary Examiner

U.S. Cl. X.R.

176—38